(12) United States Patent
Chiku et al.

(10) Patent No.: US 8,251,386 B2
(45) Date of Patent: Aug. 28, 2012

(54) SUSPENSION ARM FOR VEHICLE

(75) Inventors: Hikaru Chiku, Wako (JP); Taiji Akagawa, Wako (JP); Tetsuya Habuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 125 days.

(21) Appl. No.: 12/997,337

(22) PCT Filed: Jun. 29, 2009

(86) PCT No.: PCT/JP2009/061855
§ 371 (c)(1),
(2), (4) Date: Dec. 10, 2010

(87) PCT Pub. No.: WO2010/004899
PCT Pub. Date: Jan. 14, 2010

(65) Prior Publication Data
US 2011/0115186 A1 May 19, 2011

(30) Foreign Application Priority Data

Jul. 10, 2008 (JP) ................................. 2008-180752
Jul. 10, 2008 (JP) ................................. 2008-180753
Jul. 15, 2008 (JP) ................................. 2008-183364

(51) Int. Cl.
*B60G 3/04* (2006.01)
(52) U.S. Cl. ..... 280/124.134; 280/93.512; 280/124.135; 280/124.136
(58) Field of Classification Search ............ 280/93.512, 280/124.134, 124.135, 124.136
See application file for complete search history.

(56) References Cited

U.S. PATENT DOCUMENTS

| 4,953,278 | A | | 9/1990 | Specktor et al. | |
|---|---|---|---|---|---|
| 5,662,349 | A | * | 9/1997 | Hasshi et al. | 280/124.134 |
| 5,845,938 | A | | 12/1998 | Kato | |
| 5,992,867 | A | | 11/1999 | Kato et al. | |
| 7,273,219 | B2 | * | 9/2007 | Michel et al. | 280/124.134 |
| 7,703,783 | B2 | * | 4/2010 | Miyawaki | 280/124.134 |

(Continued)

FOREIGN PATENT DOCUMENTS

| JP | 63-152742 U | 10/1988 |
|---|---|---|
| JP | 8-332820 A | 12/1996 |

(Continued)

*Primary Examiner* — Toan To
(74) *Attorney, Agent, or Firm* — Carrier Blackman & Associates, P.C.; Joseph P. Carrier; William D. Blackman

(57) ABSTRACT

When a load facing to the rear of a vehicle body acts on a knuckle mounting portion of an arm main body of a suspension arm, if the line of action of the load deviates vertically relative to the cross-sectional center of the arm main body, a moment that vertically deforms the arm main body occurs. However, since there are provided a first inclined projecting portion that is formed so as to bulge upward in an end part on a first vehicle body mounting portion side of a first bottom wall portion and has a height that gradually decreases in going from a first upper wall portion toward the second upper wall portion, and a second inclined projecting portion that is formed so as to bulge upward in an end part on the first vehicle body mounting portion side of a second bottom wall portion and has a height that gradually decreases in going from a third upper wall portion toward the second upper wall portion, it is possible to enhance the rigidity without increasing the weight of the arm main body, thus preventing deformation of the arm main body due to the load.

14 Claims, 7 Drawing Sheets

U.S. PATENT DOCUMENTS

| | | | |
|---|---|---|---|
| 7,997,599 B2 * | 8/2011 | Zmyslowski et al. | 280/124.134 |
| 2002/0005621 A1 | 1/2002 | Christophliemke et al. | |
| 2005/0225049 A1 * | 10/2005 | Michel et al. | 280/124.134 |
| 2009/0295113 A1 * | 12/2009 | Inoue et al. | 280/124.134 |
| 2011/0198821 A1 * | 8/2011 | Hessing et al. | 280/124.134 |
| 2011/0285102 A1 * | 11/2011 | Yu et al. | 280/124.134 |
| 2011/0298192 A1 * | 12/2011 | Yu et al. | 280/124.134 |

FOREIGN PATENT DOCUMENTS

| | | |
|---|---|---|
| JP | 9-20115 A | 1/1997 |
| JP | 9-123722 A | 5/1997 |
| JP | 2002-205520 A | 7/2002 |
| JP | 2003-002025 A | 1/2003 |
| JP | 2004-090750 A | 3/2004 |
| JP | 2004-224246 A | 8/2004 |

* cited by examiner

DIRECTION OF LOAD

SUSPENSION ARM FOR VEHICLE

TECHNICAL FIELD

The present invention relates to a suspension arm for a vehicle in which an arm main body formed by press forming a metal plate includes a knuckle mounting portion on which a knuckle is mounted, a first vehicle body mounting portion that is provided inwardly of the knuckle mounting portion in a vehicle width direction and is mounted on a vehicle body, and a second vehicle body mounting portion that is provided toward a vehicle body rear side of the first vehicle body mounting portion and is mounted on the vehicle body.

Furthermore, the present invention relates to a suspension arm for a vehicle in which an arm main body formed by press forming a metal plate includes a knuckle mounting portion on which a knuckle is mounted and a vehicle body mounting portion mounted on a vehicle body, an outer face of the vehicle body mounting portion being fixed by welding to a weld part formed at an end edge of the arm main body.

Moreover, the present invention relates to a suspension arm for a vehicle that includes an arm main body formed by press forming a metal plate.

BACKGROUND ART

An arrangement in which an arm main body of a suspension arm formed by press forming a metal plate has a cross-sectional shape having an open lower face formed from an upper wall portion, a pair of side wall portions formed by downwardly bending opposite side edges of the upper wall portion, and a pair of lower wall portions formed by inwardly bending the lower edges of the side wall portions, a reinforcing rib downwardly recessed along opposite side edges of the upper wall portion is formed, and a raised part projecting upward between the two reinforcing ribs is formed is known from Patent Document 1 below.

Furthermore, an arrangement in which a hollow suspension arm is formed by superimposing and welding outer peripheral parts of a first plate-shaped member and second plate-shaped member formed by press forming a metal plate, and a pipe member for supporting a rubber bush joint is fixed by welding to an end part on the vehicle body side of the suspension arm is known from Patent Document 2 below.

Moreover, an arrangement in which an arm main body of a suspension arm formed by press forming a metal plate has a cross-sectional shape having an open lower face formed from an upper wall portion and a pair of side wall portions formed by downwardly bending opposite side edges of the upper wall portion, and rigidity is enhanced by forming a concavo-convex shape in which recesses and projections are continued in front and rear side wall portions is known from Patent Document 3 below.

Patent Document 1: Japanese Patent Application Laid-open No. 9-123722
Patent Document 2: Japanese Patent Application Laid-open No. 9-20115
Patent Document 3: Japanese Patent Application Laid-open No. 2004-90750

DISCLOSURE OF INVENTION

Problems to be Solved by the Invention

The arrangement disclosed in Patent Document 1 above aims to enhance the twist rigidity of the arm main body by forming the reinforcing rib and the raised part in the upper wall portion of the arm main body so as to make the height of its shear center close to the height of a load-acting plane, but it is difficult to make the height of the shear center completely coincide with the height of the load-acting plane, and when a large load facing in the vehicle body fore-and-aft direction is inputted by the vehicle being suddenly braked or the wheel riding over a step, there is a possibility of the arm main body being deformed. In order to avoid this, the plate thickness of the arm main body might be increased, but by so doing the problem of the weight of the arm main body increasing occurs.

There is also known a suspension arm that is formed by press forming one sheet of metal plate in order to reduce the weight and cost, the suspension arm including a horizontally disposed upper wall portion and a pair of side wall portions formed by bending peripheral edges of the upper wall portion downwardly in the vertical direction at right angles.

When a pipe member for supporting a rubber bush joint is fixed by welding to an end part on the vehicle body side of such a suspension arm, the shape of the weld part is a rectangular 'U' shape having an open lower face formed from the upper wall portion and the pair of side wall portions. Therefore, when a load facing in the vehicle body fore-and-aft direction acts on the suspension arm by the vehicle being suddenly braked or the wheel riding over a step, although a sufficient strength is ensured for a welded place of the upper wall portion, which is in a direction parallel to the direction of the load, the strength of welded places of the side wall portions, which are at right angles to the direction of the load, becomes insufficient, and there is a possibility that the weld might detach, etc.

Moreover, when the wheel rides over a step on the road surface or when sudden braking is carried out, a large load is also applied to a mounting portion via which the arm main body of the suspension arm is mounted on a knuckle or a vehicle body, but a side wall portion having a sufficient height sometimes cannot be provided in the mounting portion of the arm main body because of the need for avoiding interference between the knuckle or vehicle body and the arm main body accompanying vertical movement of the suspension arm. In such a case, there is the problem that even by forming a concavo-convex shape described in Patent Document 1 above on a side wall portion having a low height a sufficient effect in enhancing the rigidity cannot be obtained. Furthermore, the concavo-convex shape is effective when a load is applied in a direction in which the side wall portion is twisted, but there is the problem that in a portion, such as the mounting portion via which the arm main body is mounted on a knuckle or vehicle body, in which a load in a bending direction is applied, a sufficient effect in enhancing the rigidity cannot be obtained.

Enhancing the rigidity of the arm main body by forming a so-called reverse flange by inwardly bending the lower end of the side wall portion could be considered, but it is difficult to fabricate a reverse flange in the mounting portion positioned at an end part of the arm main body, materials overlap or become excessive in the reverse flange portion, and stress is concentrated on this portion, thus instead causing a degradation in durability, which is a problem.

The present invention has been accomplished in light of the above-mentioned circumstances, and it is a first object thereof to enhance the rigidity of a suspension arm against a load in the vehicle body fore-and-aft direction inputted from the wheel side without causing an increase in weight.

Furthermore, it is a second object of the present invention to enhance the strength of a weld part when fixing by welding a vehicle body mounting portion to a suspension arm having a cross-sectional shape having an open lower face.

Moreover, it is a third object of the present invention to improve durability by enhancing rigidity in the vicinity of a knuckle mounting portion or a vehicle body mounting portion of a suspension arm.

Means for Solving the Problems

In order to attain the above first object, according to a first aspect of the present invention, there is proposed a suspension arm for a vehicle in which an arm main body formed by press forming a metal plate comprises a knuckle mounting portion on which a knuckle is mounted, a first vehicle body mounting portion that is provided inwardly of the knuckle mounting portion in a vehicle width direction and is mounted on a vehicle body, and a second vehicle body mounting portion that is provided toward a vehicle body rear side of the first vehicle body mounting portion and is mounted on the vehicle body, the suspension arm comprising: a first upper wall portion that extends substantially horizontally from the first vehicle body mounting portion to the second vehicle body mounting portion in a state in which the arm main body is mounted on the vehicle body; a second upper wall portion that extends substantially horizontally from the second vehicle body mounting portion to the knuckle mounting portion in a state in which the arm main body is mounted on the vehicle body; a third upper wall portion that extends substantially horizontally from the knuckle mounting portion to the first vehicle body mounting portion in a state in which the arm main body is mounted on the vehicle body; a first bottom wall portion that is at a position lower than the first and second upper wall portions and connects the first and second upper wall portions; a second bottom wall portion that is at a position lower than the second and third upper wall portions and connects the second and third upper wall portions, a first inclined projecting portion that is formed so as to bulge upward in an end part on the first vehicle body mounting portion side of the first bottom wall portion and has a height that gradually decreases in going from the first upper wall portion toward the second upper wall portion; and a second inclined projecting portion that is formed so as to bulge upward in an end part on the first vehicle body mounting portion side of the second bottom wall portion and has a height that gradually decreases in going from the third upper wall portion toward the second upper wall portion.

Further, according to a second aspect of the present invention, in addition to the first aspect, the first inclined projecting portion has a width that gradually decreases in going from the first upper wall portion toward the second upper wall portion.

Furthermore, according to a third aspect of the present invention, in addition to the first aspect, the second inclined projecting portion has a width that gradually decreases in going from the third upper wall portion toward the second upper wall portion.

Moreover, according to a fourth aspect of the present invention, in addition to the first aspect, the arm main body comprises a third bottom wall portion that is connected at substantially the same height to the first and second bottom wall portions at a position sandwiched between the first and second inclined projecting portions, and a through hole is formed in the third bottom wall portion.

Further, according to a fifth aspect of the present invention, in addition to the first aspect, an outer face of the vehicle body mounting portion is fixed by welding to a weld part formed at an end edge of the arm main body, the weld part of the arm main body comprises a first weld part that extends substantially horizontally in a state in which the arm main body is mounted on the vehicle body, and second and third weld parts that extend downwardly from opposite ends of the first weld part, a distance between lower ends of the second and third weld parts being set larger than a distance between upper ends thereof.

Furthermore, according to a sixth aspect of the present invention, in addition to the fifth aspect, the third weld part is bent in a direction in which the third weld part moves away from the second weld part while extending downwardly from a part that is connected to the first weld part.

Moreover, according to a seventh aspect of the present invention, in addition to the fifth aspect, the arm main body comprises the second vehicle body mounting portion to a rear of the vehicle body mounting portion as the first vehicle body mounting portion, a part sandwiched between the first and second vehicle body mounting portions of the arm main body comprises the upper wall portion and first and second side wall portions formed by downwardly bending opposite side edges of the upper wall portion, and the first side wall portion is bent in a direction in which its first vehicle body mounting portion side moves away from the second side wall portion and is continuous to the third weld part.

Further, according to an eighth aspect of the present invention, in addition to the seventh aspect, a downwardly recessed recess is formed in a part in which the upper wall portion and the first side wall portion are connected.

Furthermore, according to a ninth aspect of the present invention, in addition to the first aspect, the arm main body comprises the knuckle mounting portion on which the knuckle is mounted and the vehicle body mounting portion that is mounted on the vehicle body, and a concavo-convex portion is formed in a peripheral edge part of at least one of the knuckle mounting portion and the vehicle body mounting portion.

Moreover, according to a tenth aspect of the present invention, in addition to the ninth aspect, the concavo-convex portion has a substantially polygonal shape or a substantially circular shape.

Further, according to an eleventh aspect of the present invention, in addition the ninth aspect, the arm main body comprises the upper wall portion that extends in a substantially horizontal direction in a state in which the arm main body is mounted on the vehicle body, and a side wall portion that is formed by downwardly bending a peripheral edge of the upper wall portion, the height of the side wall portion is made smaller in the vicinity of at least one of the knuckle mounting portion and the vehicle body mounting portion in which the concavo-convex portion is formed than other parts, and the concavo-convex portion is formed on a border between the upper wall portion and the side wall portion.

Furthermore, according to a twelfth aspect of the present invention, in addition to the ninth aspect, the arm main body comprises the upper wall portion that extends in a substantially horizontal direction in a state in which the arm main body is mounted on the vehicle body, a side wall portion that is formed by downwardly bending a peripheral edge of the upper wall portion, and a lower wall portion that is formed by bending an end part that is not continuous to the upper wall portion in at least one part of the side wall portion, and the concavo-convex portion is formed at a position of a boundary between a part where the lower wall portion is provided and a part where the lower weld portion is not provided within the border between the upper wall portion and the side wall portion.

Moreover, in order to attain the above second object, according to a thirteenth aspect of the present invention, there is proposed a suspension arm for a vehicle in which an arm main body that is formed by press forming a metal plate comprises a knuckle mounting portion on which a knuckle is mounted and a vehicle body mounting portion that is mounted on a vehicle body, and an outer face of the vehicle body mounting portion is fixed by welding to a weld part formed at an end edge of the arm main body, wherein the weld part of the arm main body comprises a first weld part that extends substantially horizontally in a state in which the arm main body is mounted on the vehicle body, and second and third weld parts that extend downwardly from opposite ends of the first weld part, a distance between lower ends of the second and third weld parts being set larger than a distance between upper ends thereof.

Further, in order to attain the above third object, according to a fourteenth aspect of the present invention, there is proposed a suspension arm for a vehicle comprising an arm main body that is formed by press forming a metal plate, wherein the arm main body comprises a knuckle mounting portion on which a knuckle is mounted and a vehicle body mounting portion that is mounted on a vehicle body, and a concavo-convex portion is formed on a peripheral edge part of at least one of the knuckle mounting portion and the vehicle body mounting portion.

First and second vehicle body mounting portions 17b and 17c of an embodiment correspond to the vehicle body mounting portion of the present invention, first and second upper wall portions 17d and 17e of the embodiment correspond to the upper wall portion of the present invention, first and second side wall portions 17j and 17k of the embodiment correspond to the side wall portion of the present invention, a recess 17s of the embodiment corresponds to the concavo-convex portion of the present invention, and first to third weld parts w1 to w3 of the embodiment correspond to the weld part of the present invention.

Effects of the Invention

In accordance with the first aspect of the present invention, when, for example, a load facing toward the rear of the vehicle body acts on the knuckle mounting portion of the arm main body while the vehicle is being suddenly braked or the wheel is riding over a step, if the line of action of the load is vertically displaced relative to the cross-sectional center of the arm main body, a moment that vertically deforms the arm main body occurs, but since the first inclined projecting portion, which is formed in the end part on the first vehicle body mounting portion side of the first bottom wall portion so as to bulge upward and whose height gradually decreases in going from the first upper wall portion toward the second upper wall portion, and the second inclined projecting portion, which is formed in the end part on the first vehicle body mounting portion side of the second bottom wall portion so as to bulge upward and whose height gradually decreases in going from the third upper wall portion toward the second upper wall portion, are provided, it is possible to enhance the rigidity of the arm main body without increasing the weight and prevent deformation of the arm main body due to the load.

Furthermore, in accordance with the second aspect of the present invention, since the width of the first inclined projecting portion gradually decreases in going from the first upper wall portion toward the second upper wall portion, it is possible to prevent stress from concentrating at the border between the first inclined projecting portion and the first bottom wall portion.

Moreover, in accordance with the third aspect of the present invention, since the width of the second inclined projecting portion gradually decreases in going from the third upper wall portion toward the second upper wall portion, it is possible to prevent stress from concentrating at the border between the second inclined projecting portion and the second bottom wall portion.

Furthermore, in accordance with the fourth aspect of the present invention, since the third bottom wall portion connected to the first and second bottom wall portions at substantially the same height is provided at a position of the arm main body sandwiched between the first and second inclined projecting portions, and the through hole is formed in the third bottom wall portion, not only is it possible to enhance operability by utilizing the through hole as an insertion hole for a bolt, a nut, a tool, etc. when assembling the suspension arm on the vehicle body, but it is also possible to utilize the through hole as a drain hole for drainage or as a cutout hole for weight reduction.

Moreover, in accordance with the fifth or thirteenth aspect of the present invention, since the weld part at the end edge of the arm main body to which the outer face of the vehicle body mounting portion is welded is formed from the first weld part extending substantially horizontally and the second and third weld parts extending downwardly from opposite ends of the first weld part, when a load in the vehicle body fore-and-aft direction is inputted into the weld part, the strength of the first weld part, which is parallel to the direction of the load, is high, but the strength of the second and third weld parts, which are not parallel to the direction of the load, is low. In this arrangement, although the strength is the weakest when the second and third weld parts are at right angles relative to the direction of the load, setting the distance between the lower ends of the second and third weld parts larger than that between the upper ends thereof enables the direction of the second and third weld parts to be changed from being at right angles relative to the direction of the load to being more parallel, thus enhancing the strength thereof.

Furthermore, in accordance with the sixth aspect of the present invention, since the third weld part is curved in the direction in which it moves away from the second weld part while extending downwardly from the portion connected to the first weld part, making the direction of the lower part of the third weld part more parallel relative to the direction of the load and dispersing the load in the vehicle body fore-and-aft direction inputted to the weld part from the arm main body over a wider range of the first vehicle body mounting portion enables the durability of the weld part to be enhanced.

Moreover, in accordance with the seventh aspect of the present invention, since the arm main body includes the first vehicle body mounting portion on the front side and the second vehicle body mounting portion on the rear side, and among the upper wall portion and first and second side wall portions forming a portion sandwiched between the first and second vehicle body mounting portions, the first side wall portion bends in the direction in which the first vehicle body mounting portion side thereof moves away from the second side wall portion and is continuous to the third weld part, it is possible to disperse the load acting on the third weld part in the first side wall portion, thus enhancing the durability of the third weld part.

Furthermore, in accordance with the eighth aspect of the present invention, since the downwardly recessed recess is formed in the portion where the upper wall portion and the first side wall portion are connected, it is possible to enhance the rigidity of the portion of the arm main body sandwiched by the first and second vehicle body mounting portions by the reinforcing effect of the recess, thus further improving the durability of the suspension arm with respect to a load in the vehicle body fore-and-aft direction.

Moreover, in accordance with the ninth or fourteenth aspect of the present invention, since the arm main body of the suspension arm formed by press forming a metal plate has a concavo-convex portion formed in a peripheral edge part of the knuckle mounting portion, on which a knuckle is mounted, or the vehicle body mounting portion, which is mounted on the vehicle body, it is possible to enhance the rigidity of the knuckle mounting portion or vehicle body mounting portion by means of the concavo-convex portion, thus improving the durability toward the load input.

Furthermore, in accordance with the tenth aspect of the present invention, since the shape of the concavo-convex portion is substantially polygonal or substantially circular, regardless of the direction in which a load is inputted into the concavo-convex portion it is possible to ensure the rigidity in the vicinity of the concavo-convex portion.

Moreover, in accordance with the eleventh aspect of the present invention, the arm main body includes the upper wall portion and the side wall portion formed by downwardly bending the peripheral edge of the upper wall portion, and even when a sufficient height cannot be ensured for the side wall portion in order to avoid interference with another member in the vicinity of at least one of the knuckle mounting portion and the vehicle body mounting portion, since the concavo-convex portion is formed at the border between the upper wall portion and the side wall portion, it is possible to ensure the rigidity in the vicinity of the concavo-convex portion.

Furthermore, in accordance with the twelfth aspect of the present invention, the arm main body includes the upper wall portion, the side wall portion formed by downwardly bending the peripheral edge of the upper wall portion, and the lower wall portion formed by inwardly bending at least part of the side wall portion, and since the concavo-convex portion is formed at a position on the boundary, within the border between the upper wall portion and the side wall portion, between a portion where the lower wall portion is provided and a portion where it is not provided, it is possible to reinforce effectively by means of the concavo-convex portion a portion at which the lower wall portion stops and stress is easily concentrated.

EXPLANATION OF REFERENCE NUMERALS AND SYMBOLS

Figure 1:
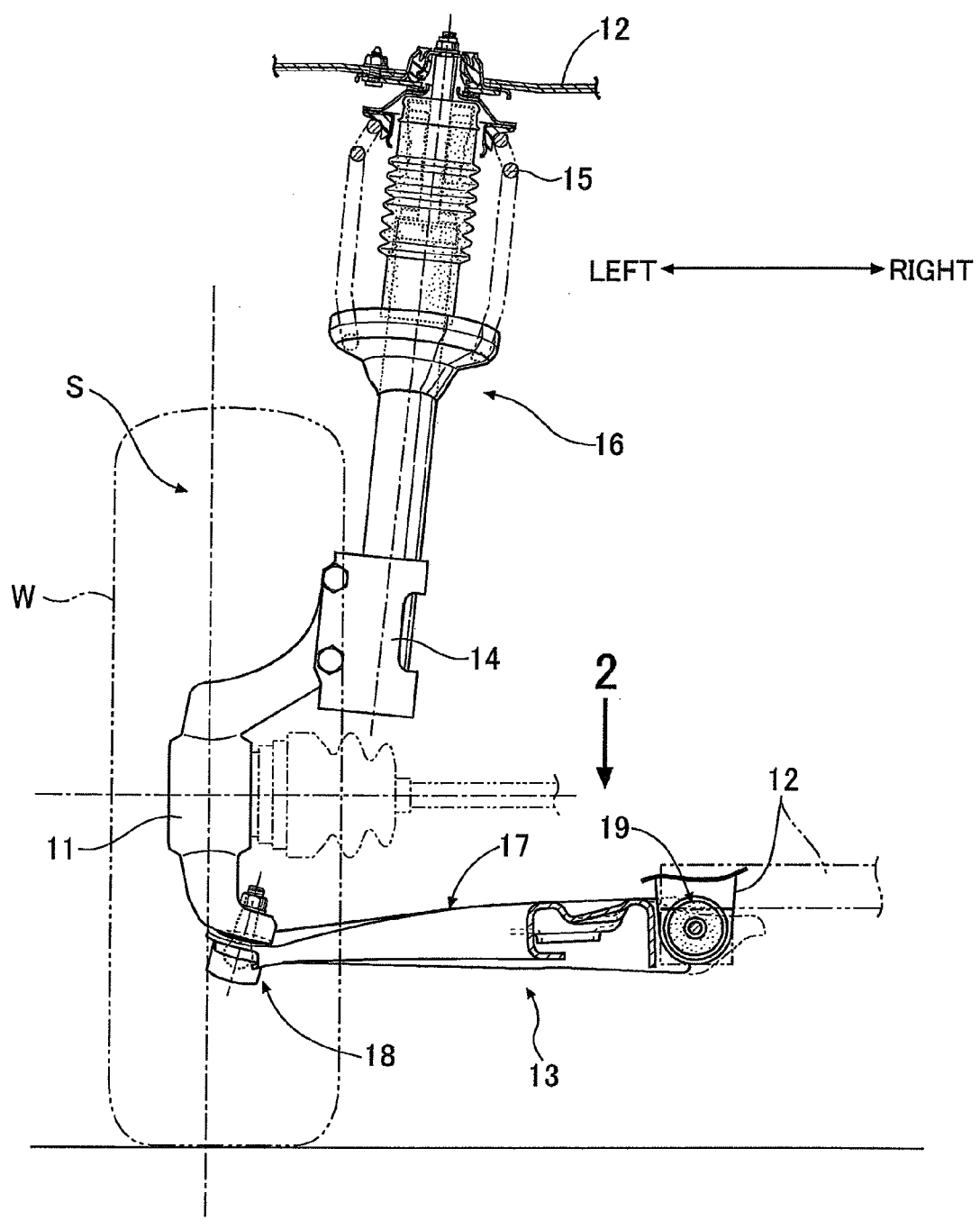
FIG. 1 is a rear view of a strut type suspension system for a front left wheel. (first embodiment)

11 Knuckle
12 Vehicle body
17 Arm main body
17a Knuckle mounting portion
17b First vehicle body mounting portion (vehicle body mounting portion)
17c Second vehicle body mounting portion (vehicle body mounting portion)
17d First upper wall portion (upper wall portion)
17e Second upper wall portion (upper wall portion)
17f Third upper wall portion
17g First bottom wall portion
17h Second bottom wall portion
17i Third bottom wall portion
17j First side wall portion (side wall portion)
17k Second side wall portion (side wall portion)
17n Lower wall portion
17o First inclined projecting portion
17p Second inclined projecting portion
17q Through hole
17s Recess (concavo-convex portion)
17u Recess
A Distance between upper ends of second and third weld parts
B Distance between lower ends of second and third weld parts
w1 First weld part (weld part)
w2 Second weld part (weld part)
w3 Third weld part (weld part)

BEST MODE FOR CARRYING OUT THE INVENTION

A mode for carrying out the present invention is explained below by reference to attached drawings.

First Embodiment

FIG. 1 to FIG. 10 show a mode for carrying out the present invention.

Figure 2:
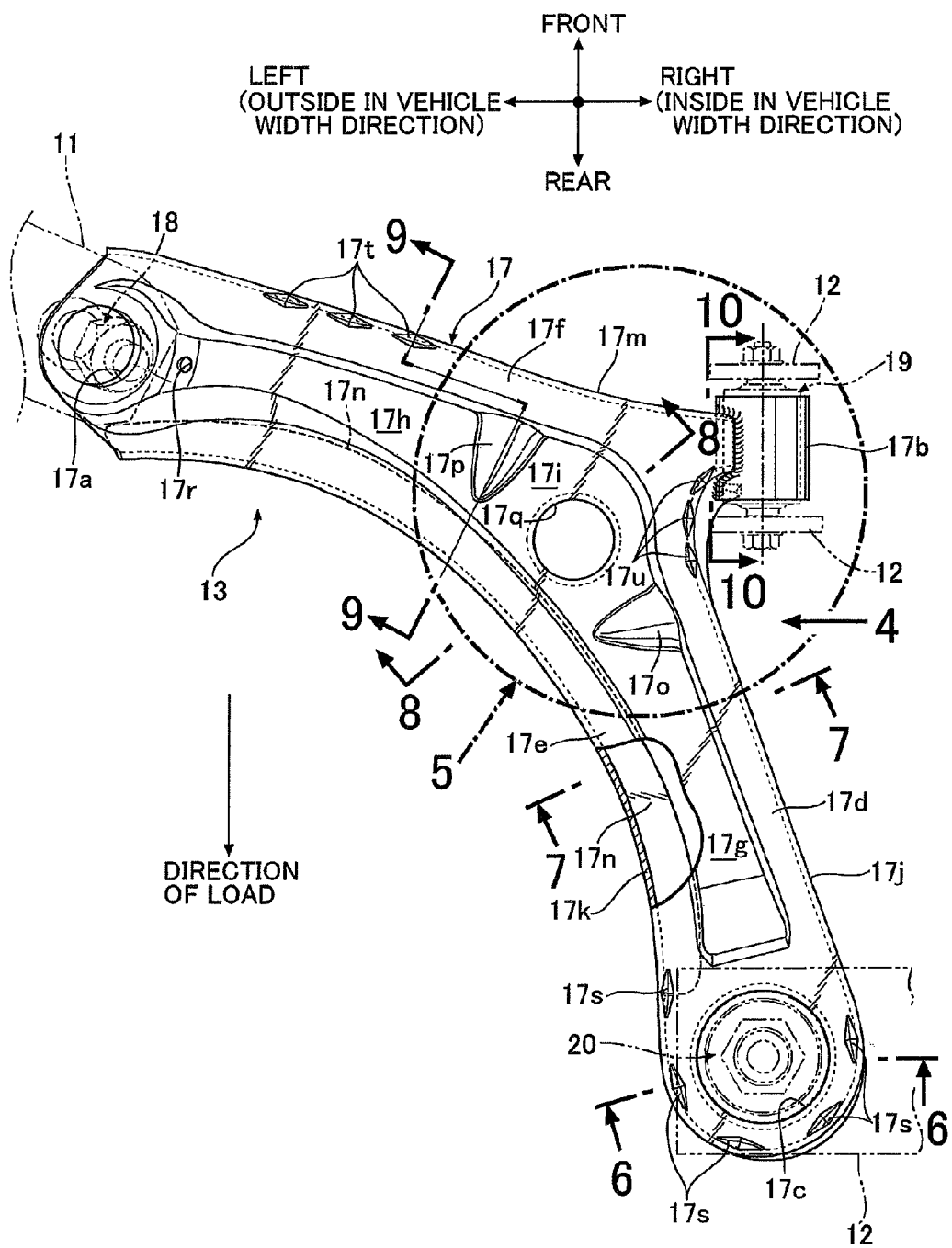
FIG. 2 is a view from the direction of arrow 2 in FIG. 1 (top view of a suspension arm). (first embodiment)
Figure 3:
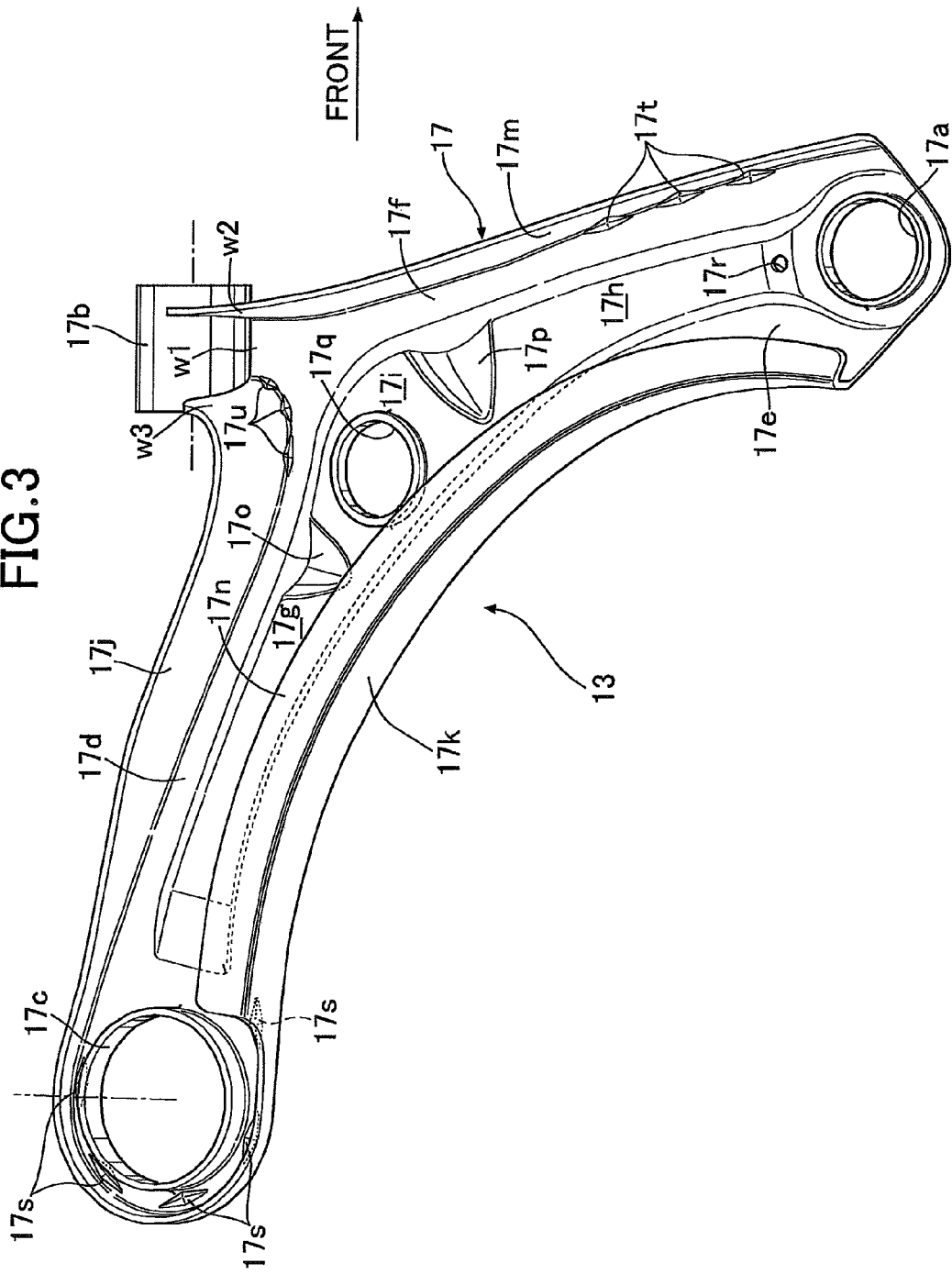
FIG. 3 is a lower face view of the suspension arm. (first embodiment)
Figure 4:
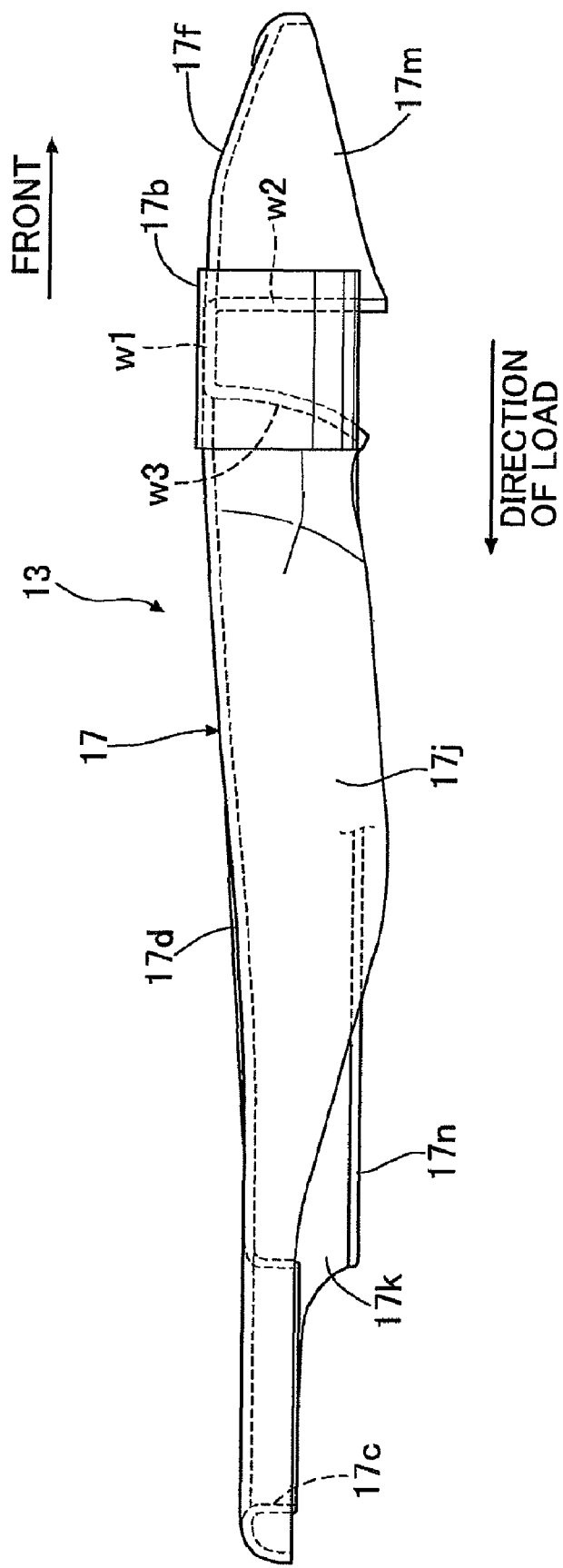
FIG. 4 is a view from the direction of arrow 4 in FIG. 2. (first embodiment)

As shown in FIG. 1 to FIG. 3, a strut type suspension system S that suspends a wheel W, which is a turning wheel, includes a suspension arm 13 that connects a vehicle body 12 and a knuckle 11 rotatably supporting the wheel W, and the vehicle body 12 and a bracket 14 provided on an upper part of the knuckle 11 are connected by a damper 16 that includes a suspension spring 15 on the outer periphery of an upper part.

An arm main body 17 of the suspension arm 13, which has an arc-shaped curved shape overall, is formed by press forming a metal plate, and a knuckle mounting portion 17a formed from a circular opening provided at the outer end in a vehicle width direction thereof is pivotably supported on a lower part of the knuckle 11 via a ball joint 18. A first vehicle body mounting portion 17b provided inwardly of the knuckle mounting portion 17a of the arm main body 17 in the vehicle width direction is formed from a pipe member having a circular cross-section welded to the arm main body 17, and is elastically supported on the vehicle body 12 via a rubber bush joint 19 having an axis in the vehicle body fore-and-aft direction. A second vehicle body mounting portion 17c provided to the rear of the first vehicle body mounting portion 17b of the arm main body 17 is formed from a circular opening, and is elastically supported on the vehicle body 12 via a rubber bush joint 20 provided thereon so as to have an axis in the vehicle body vertical direction.

The arm main body 17 is disposed substantially horizontally in a state in which the wheel W is not bumping or rebounding, and includes a first upper wall portion 17d, a second upper wall portion 17e, and a third upper wall portion 17f, which rise high along the outer periphery of an upper face thereof. The first upper wall portion 17d extends substantially horizontally from the first vehicle body mounting portion 17b to the second vehicle body mounting portion 17c, the second upper wall portion 17e extends substantially horizontally from the second vehicle body mounting portion 17c to the knuckle mounting portion 17a, and the third upper wall portion 17f extends substantially horizontally from the knuckle mounting portion 17a to the first vehicle body mounting portion 17b.

A portion surrounded by the first upper wall portion 17d, the second upper wall portion 17e, and the third upper wall portion 17f forms a sunken flat face, a portion sandwiched between the first and second upper wall portions 17d and 17e is defined as a first bottom wall portion 17g, a portion sandwiched between the second and third upper wall portions 17e and 17f is defined as a second bottom wall portion 17h, and a portion sandwiched between the first bottom wall portion 17g and the second bottom wall portion 17h in the vicinity of the first vehicle body mounting portion 17b is defined as a third bottom wall portion 17i.

Outer edges of the first upper wall portion 17d, the second upper wall portion 17e, and the third upper wall portion 17f are downwardly bent and are respectively defined as a first side wall portion 17j, a second side wall portion 17k, and a third side wall portion 17m; the first side wall portion 17j and the second side wall portion 17k are continuous so as to surround the outer periphery of the second vehicle body mounting portion 17c, but the second side wall portion 17k and the third side wall portion 17m are separated in the knuckle mounting portion 17a area, and the third side wall portion 17m and the first side wall portion 17j are separated in the first vehicle body mounting portion 17b area. The lower edge of the second side wall portion 17k is bent so as to go around a lower face side of the arm main body 17 and forms a lower wall portion 17n.

Figure 7:
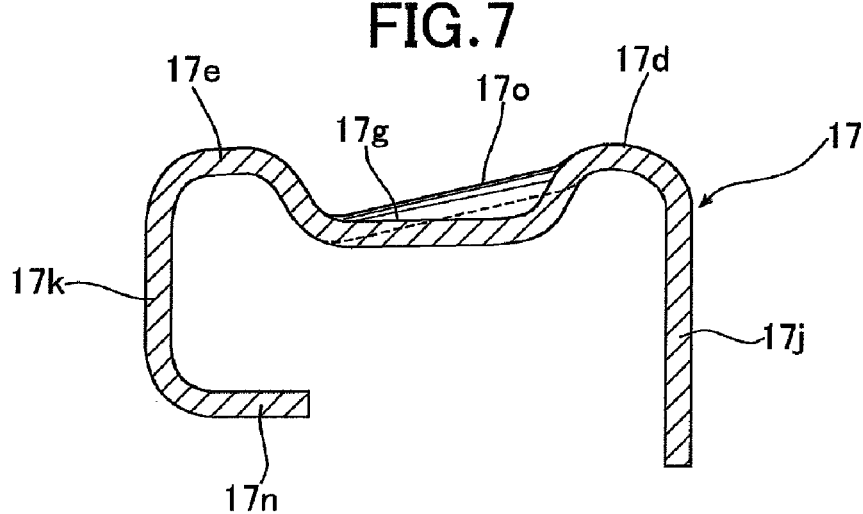
FIG. 7 is a sectional view along line 7-7 in FIG. 2. (first embodiment)
Figure 9:
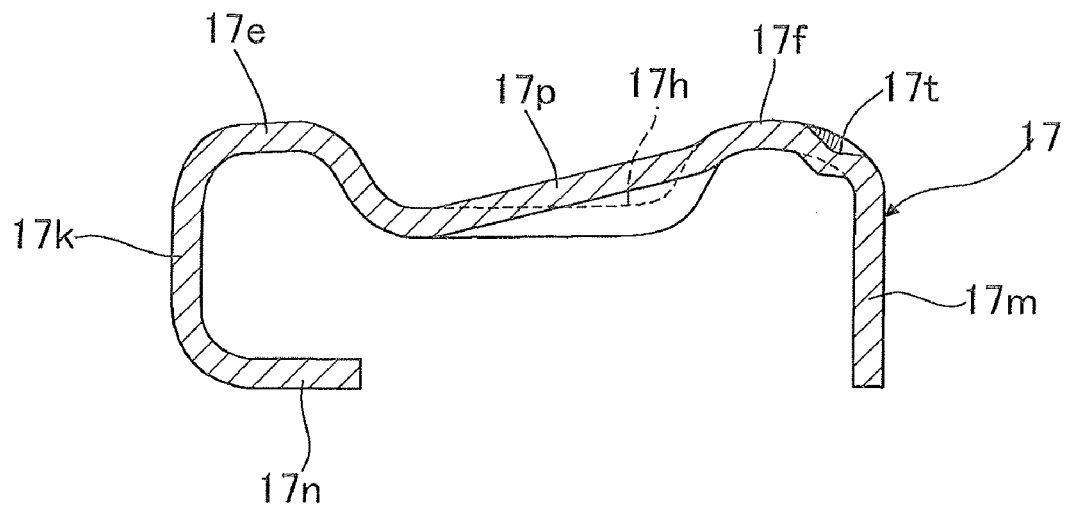
FIG. 9 is a sectional view along line 9-9 in FIG. 2. (first embodiment)

As is clear from FIG. 2, FIG. 7, and FIG. 9, at the boundary between the first bottom wall portion 17g and the third bottom wall portion 17i, a first inclined projecting portion 17o extending from the inner edge of the first upper wall portion 17d toward the second upper wall portion 17e is upwardly projectingly provided, and at the boundary between the second bottom wall portion 17h and the third bottom wall portion 17i, a second inclined projecting portion 17p extending from the inner edge of the third upper wall portion 17f toward the second upper wall portion 17e is upwardly projectingly provided. The first inclined projecting portion 17o is formed into a triangular shape in which a part connected to the inner edge of the first upper wall portion 17d is the highest and the widest and the height and width decrease therefrom toward the second upper wall portion 17e. Similarly, the second inclined projecting portion 17p is formed into a triangular shape in which a part connected to the inner edge of the third upper wall portion 17f is the highest and the widest and the height and width decrease therefrom toward the second upper wall portion 17e.

Figure 5:
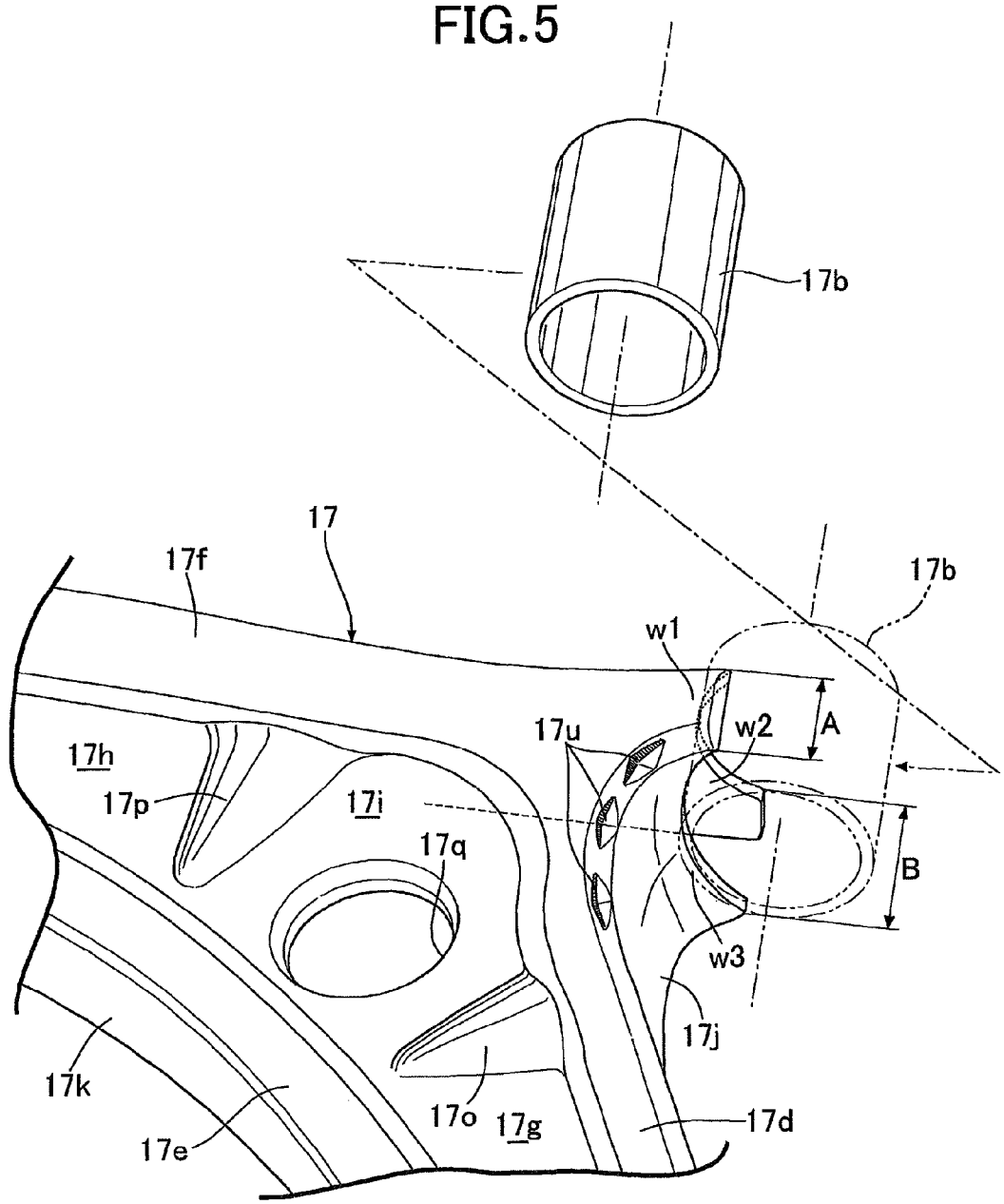
FIG. 5 is an enlarged perspective view of part 5 in FIG. 2. (first embodiment)
Figure 10:
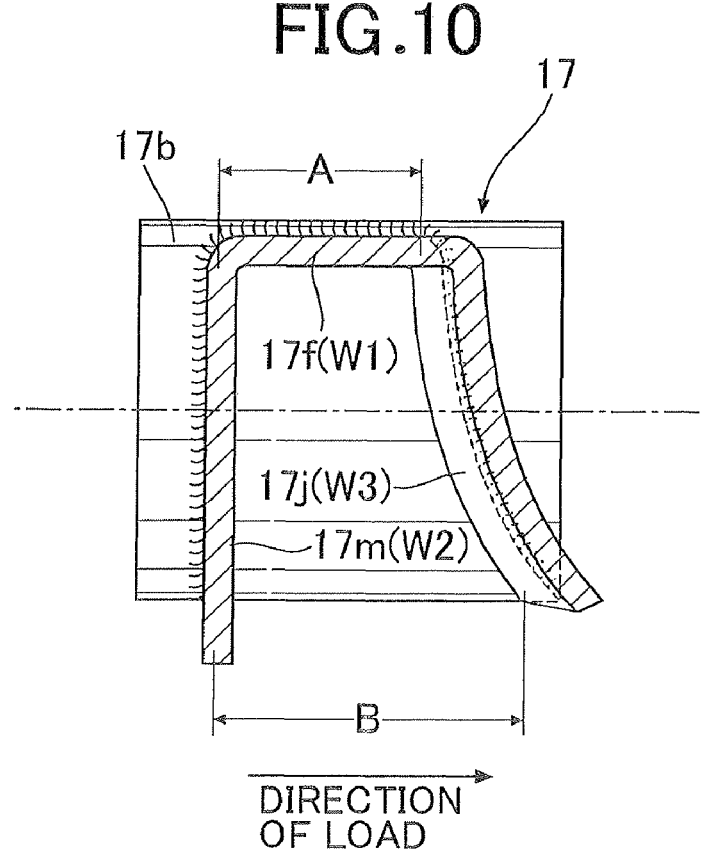
FIG. 10 is a sectional view along line 10-10 in FIG. 2. (first embodiment)

As is clear from FIG. 5 and FIG. 10, a part of the arm main body 17 that is welded to the pipe-shaped first vehicle body mounting portion 17b is formed from a straight line-shaped first weld part w1 to which an end part of the third upper wall portion 17f is welded horizontally and in parallel to the axis of the first vehicle body mounting portion 17b, an arc-shaped second weld part w2 to which the third side wall portion 17m formed by bending the outer edge of the third upper wall portion 17f downwardly at substantially right angles is welded along an outer peripheral face of the pipe-shaped first vehicle body mounting portion 17b, and an arc-shaped third weld part w3 to which the first side wall portion 17j formed by bending the outer edge of the first upper wall portion 17d downwardly at an obtuse angle is welded along an outer peripheral face of the pipe-shaped first vehicle body mounting portion 17b.

Figure 8:
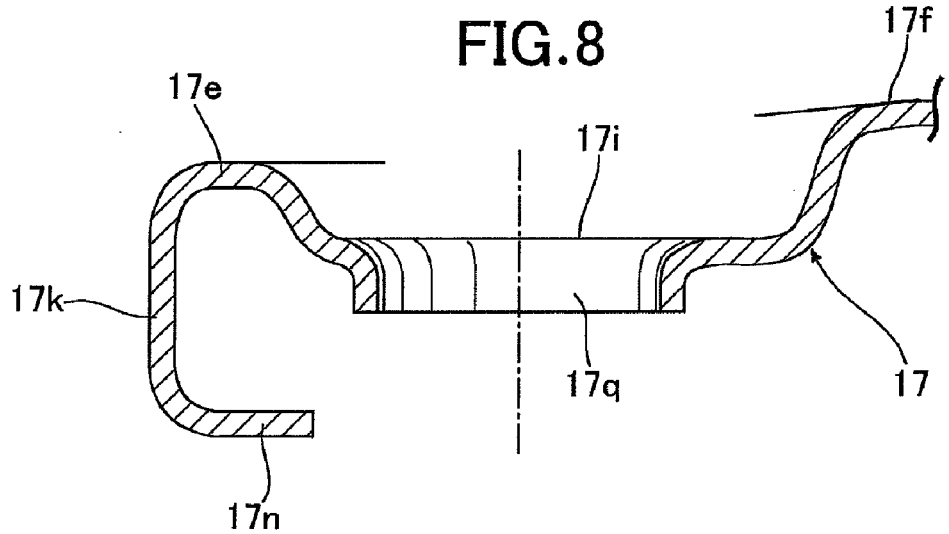
FIG. 8 is a sectional view along line 8-8 in FIG. 2. (first embodiment)

As is clear from FIG. 2, FIG. 5, and FIG. 8, a circular through hole 17q is formed in a central part of the third bottom wall portion 17i sandwiched between the first inclined projecting portion 17o and the second inclined projecting portion 17p, and a small diameter drain hole 17r is formed in the second bottom wall portion 17h, which is adjacent to the knuckle mounting portion 17a. The through hole 17q is utilized as a hole into which a bolt, a nut, a tool, etc. is inserted in order to enhance operability when assembling the suspension arm 13 onto the vehicle body, and at the same time functions also as a drain hole for draining water collected in the first to third bottom wall portions 17g, 17h, and 17i. Furthermore, the drain hole 17r functions, in cooperation with the through hole 17q, as a drain hole for draining water collected in the first to third bottom wall portions 17g, 17h, and 17i.

Figure 6:
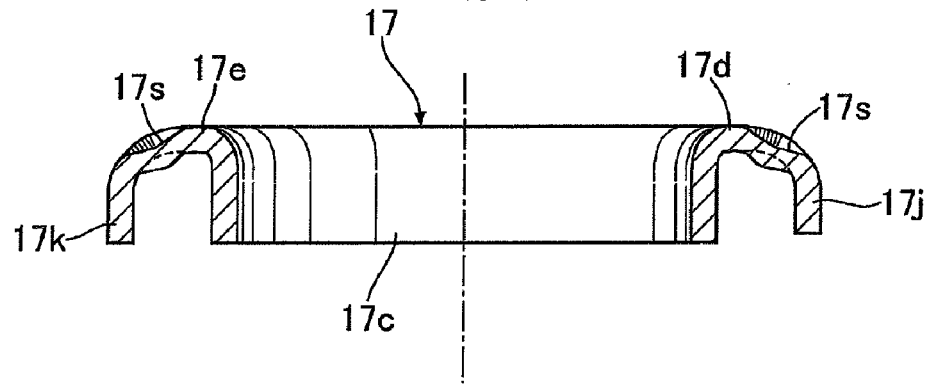
FIG. 6 is a sectional view along line 6-6 in FIG. 2. (first embodiment)

As is clear from FIG. 2 and FIG. 6, a plurality (5 in the embodiment) of diamond-shaped recesses 17s are formed in a portion around the second vehicle body mounting portion 17c where the first upper wall portion 17d and the second upper wall portion 17e are connected, so as to surround approximately half of the periphery of the second vehicle body mounting portion 17c. Among these recesses 17s, one at an end is formed on a boundary between the second upper wall portion 17e and the second side wall portion 17k, the boundary corresponding to an end of the lower wall portion 17n connected to the second side wall portion 17k (ref. FIG. 2 and FIG. 3). The recesses 17s are formed in a corner extending over the first and second upper wall portions 17d and 17e and the first and second side wall portions 17j and 17k, and the depth of the recesses 17s is for example about half of the thickness of the arm main body 17.

Furthermore, a plurality (3 in the embodiment) of diamond-shaped recesses 17t (see FIG. 2) are formed in a corner on the second bottom wall portion 17h side of the third upper wall portion 17f, and a plurality (3 in the embodiment) of diamond-shaped recesses 17u (see FIG. 2 and FIG. 5) are formed in a corner on the first side wall 17j side at the front end of the first upper wall portion 17d.

The operation of the mode for carrying out the present invention having the above-mentioned arrangement is now explained.

When the vehicle brakes suddenly, the vehicle body attempts to move forward by virtue of inertia while leaving the wheel W on the road surface, and a load that attempts to make the knuckle mounting portion 17a move to the rear side of the vehicle body relative to the first and second vehicle body mounting portions 17b and 17c of the arm main body 17 of the suspension arm 13 therefore acts. Furthermore, when the wheel W rides over a step on the road surface, a load that attempts to move the knuckle mounting portion 17a to the rear side of the vehicle body similarly acts.

In this process, if the line of action of the load deviates vertically from the cross-sectional center of the arm main body 17, a moment that vertically deforms the arm main body 17 occurs, but it is difficult to make the cross-sectional center of the arm main body 17 coincide with the line of action of the load in the vertical direction. However, in accordance with the present embodiment, since the first inclined projecting portion 17o is formed so as to bulge upward on the end part on the first vehicle body mounting portion 17b side of the first bottom wall portion 17g of the arm main body 17, and the second inclined projecting portion 17p is formed so as to bulge upward on the end part on the first vehicle body mounting portion 17b side of the second bottom wall portion 17h of the arm main body 17, it is possible to enhance rigidity by means of these first and second inclined projecting portions 17o and 17p without increasing the weight of the arm main body 17, thereby preventing deformation of the arm main body 17 by the load.

In particular, since the first inclined projecting portion 17o is continuous to the first bottom wall portion 17g while reducing in height and width in going from the first upper wall portion 17d side toward the second upper wall portion 17e side, and the second inclined projecting portion 17p is continuous to the second bottom wall portion 17h while reducing in height and width in going from the third upper wall portion 17f side toward the second upper wall portion 17e side, it is possible to prevent stress from concentrating at the border between the first and second inclined projecting portions 17o and 17p and the first and second bottom wall portions 17g and 17h. Moreover, since the third bottom wall portion 17i connected to the first and second bottom wall portions 17g and 17h is provided at the position sandwiched between the first and second inclined projecting portions 17o and 17p of the arm main body 17, and the through hole 17q is formed in the third bottom wall portion 17i, not only is it possible to enhance operability by utilizing the through hole 17q as an insertion hole for a bolt, a nut, a tool, etc. when assembling the suspension arm 13 on the vehicle body 12, but it is also possible to utilize the through hole 17q as a drain hole for drainage or as a cutout hole for weight reduction.

Furthermore, since the plurality of diamond-shaped recesses 17s are formed in the peripheral edge part of the second vehicle body mounting portion 17c of the arm main body 17, it is possible to enhance the rigidity of the second vehicle body mounting portion 17c against a load inputted from any direction, thus improving durability. Since, among the plurality of recesses 17s, one at an end is provided in the vicinity of the part where the lower wall portion 17n stops and stress concentrates, it is possible to enhance effectively the rigidity of that part.

In particular, with regard to the second vehicle body mounting portion 17c, which is supported on the vehicle body 12 by the rubber bush joint 20 in a vertically swingable manner, if the height of the first and second side wall portions 17j and 17k surrounding the periphery thereof is high, there is a possibility that the first and second side wall portions 17j and 17k will interfere with the vehicle body 12, and the height of the first and second side wall portions 17j and 17k is therefore set lower for a part around the second vehicle body mounting portion 17c than other parts. As a result, the rigidity of the arm main body 17 becomes low in the vicinity of the second vehicle body mounting portion 17c, but since the recesses 17s are formed at the border between the first and second upper wall portions 17d and 17e and the first and second side wall portions 17j and 17k in that part, it is possible to enhance the rigidity in the vicinity of the second vehicle body mounting portion 17c of the arm main body 17.

Similarly, it is possible to enhance the rigidity between the knuckle mounting portion 17a and the first vehicle body mounting portion 17b of the arm main body 17 by means of the plurality of diamond-shaped recesses 17t formed in the corner on the second bottom wall portion 17h side of the third upper wall portion 17f of the arm main body 17, and it is also possible to enhance the rigidity in the vicinity of the first vehicle body mounting portion 17b of the arm main body 17 by means of the plurality of diamond-shaped recesses 17u formed in the corner on the first side wall portion 17j side at the front end of the first upper wall portion 17d of the arm main body 17.

As shown in FIG. 5 and FIG. 10, since the weld part at the end edge of the arm main body 17, to which the outer face of the pipe-shaped first vehicle body mounting portion 17b is welded, is formed from the substantially horizontally extending first weld part w1 and the second and third weld parts w2 and w3 extending downwardly from the front and rear opposite ends of the first weld part w1, when a load facing to the rear of the vehicle body is inputted into the weld part, the strength of the first weld part w1, which is parallel to the direction of the load, is high, but the strength of the second and third weld parts w2 and w3, which are not parallel to the direction of the load, is low. In this case, the strength of the second and third weld parts w2 and w3 is the weakest when they are at right angles relative to the direction of the load, but since the distance B between the lower ends of the second and third weld parts w2 and w3 is set larger than the distance A between the upper ends thereof, the direction of the second and third weld parts w2 and w3 changes from a right angle to being more parallel to the direction of the load, thus enhancing the strength.

In particular, since the third weld part w3 is bent in the direction in which it moves away from the second weld part w2 while extending downwardly from the part connected to the horizontally extending first weld part w1, the direction of the lower part of the third weld part w3 is made closer to being parallel to the direction of the load, and the load in the vehicle body fore-and-aft direction inputted from the arm main body 17 into the weld part is dispersed over a wider range of the first vehicle body mounting portion 17b, thereby enhancing the durability of the weld part. Moreover, among the first and second upper wall portions 17d and 17e and the first and second side wall portions 17j and 17k forming the portion sandwiched between the first and second vehicle body mounting portions 17b and 17c of the arm main body 17, since the first side wall portion 17j is bent in the direction in which the first vehicle body mounting portion 17b side thereof moves away from the second side wall portion 17k and is continuous to the third weld part w3, it is possible to disperse the load applied to the third weld part w3 toward the first side wall portion 17j, thus enhancing the durability of the third weld part w3.

A mode for carrying out the present invention is explained in detail above, but the present invention may be modified in a variety of ways as long as the modifications do not depart from the spirit and scope thereof.

For example, in the embodiment the suspension arm 13 of the strut type suspension system S is illustrated, but the present invention may be applied to a suspension arm of any other type of suspension system.

Furthermore, in the embodiment the second weld part w2 on the front side is formed downward at right angles relative to the first weld part w1 on the upper side, and the third weld part w3 on the rear side is formed obliquely downward to the rear relative to the first weld part w1 on the upper side, but the second weld part w2 on the front side may be formed obliquely downward to the front and the third weld part w3 on the rear side may be formed downward at right angles; alternatively, the second weld part w2 on the front side may be formed obliquely downward to the front and the third weld part w3 on the rear side may be formed obliquely downward to the rear.

Moreover, in the embodiment the recesses 17s are formed on the peripheral edge part of the second vehicle body mounting portion 17c, but a recess may be formed on a peripheral edge part of the knuckle mounting portion 17a or the first vehicle body mounting portion 17b.

Furthermore, the same operational effects may be achieved by forming projections instead of the recesses 17s of the embodiment, and the shape of the recesses 17s is not limited to a diamond shape and may be various polygonal, circular, or elliptical shapes.

The invention claimed is:

1. A suspension arm for a vehicle in which an arm main body formed by press forming a metal plate comprises a knuckle mounting portion on which a knuckle is mounted, a first vehicle body mounting portion that is provided inwardly of the knuckle mounting portion in a vehicle width direction and is mounted on a vehicle body, and a second vehicle body mounting portion that is provided toward a vehicle body rear side of the first vehicle body mounting portion and is mounted on the vehicle body, the suspension arm comprising:
- a first upper wall portion that extends substantially horizontally from the first vehicle body mounting portion to the second vehicle body mounting portion in a state in which the arm main body is mounted on the vehicle body;
- a second upper wall portion that extends substantially horizontally from the second vehicle body mounting portion to the knuckle mounting portion in a state in which the arm main body is mounted on the vehicle body;
- a third upper wall portion that extends substantially horizontally from the knuckle mounting portion to the first vehicle body mounting portion in a state in which the arm main body is mounted on the vehicle body;
- a first bottom wall portion that is at a position lower than the first and second upper wall portions and connects the first and second upper wall portions;
- a second bottom wall portion that is at a position lower than the second and third upper wall portions and connects the second and third upper wall portions,
- a first inclined projecting portion that is formed so as to bulge upward in an end part on the first vehicle body mounting portion side of the first bottom wall portion and has a height that gradually decreases in going from the first upper wall portion toward the second upper wall portion; and
- a second inclined projecting portion that is formed so as to bulge upward in an end part on the first vehicle body mounting portion side of the second bottom wall portion and has a height that gradually decreases in going from the third upper wall portion toward the second upper wall portion.

2. The suspension arm for a vehicle according to claim 1, wherein the first inclined projecting portion has a width that gradually decreases in going from the first upper wall portion toward the second upper wall portion.

3. The suspension arm for a vehicle according to claim 1, wherein the second inclined projecting portion has a width that gradually decreases in going from the third upper wall portion toward the second upper wall portion.

4. The suspension arm for a vehicle according to claim 1, wherein the arm main body comprises a third bottom wall portion that is connected at substantially the same height to the first and second bottom wall portions at a position sandwiched between the first and second inclined projecting portions, and a through hole is formed in the third bottom wall portion.

5. The suspension arm for a vehicle according to claim 1, wherein an outer face of the vehicle body mounting portion is fixed by welding to a weld part formed at an end edge of the arm main body,
the weld part of the arm main body comprises a first weld part that extends substantially horizontally in a state in which the arm main body is mounted on the vehicle body, and second and third weld parts that extend downwardly from opposite ends of the first weld part, a distance between lower ends of the second and third weld parts being set larger than a distance between upper ends thereof.

6. The suspension arm for a vehicle according to claim 5, wherein the third weld part is bent in a direction in which the third weld part moves away from the second weld part while extending downwardly from a part that is connected to the first weld part.

7. The suspension arm for a vehicle according to claim 5, wherein the arm main body comprises the second vehicle body mounting portion to a rear of the vehicle body mounting portion as the first vehicle body mounting portion,
- a part sandwiched between the first and second vehicle body mounting portions of the arm main body comprises the first and second upper wall portions and first and second side wall portions formed by downwardly bending opposite side edges of the first and second upper wall portions, and
- the first side wall portion is bent in a direction in which its first vehicle body mounting portion side moves away from the second side wall portion and is continuous to the third weld part.

8. The suspension arm for a vehicle according to claim 7, wherein a downwardly recessed recess is formed in a part in which the first upper wall portion and the first side wall portion are connected.

9. The suspension arm for a vehicle according to claim 1, wherein the arm main body comprises the knuckle mounting portion on which the knuckle is mounted and the first and second vehicle body mounting portions that are mounted on the vehicle body, and a concavo-convex portion is formed in a peripheral edge part of at least one of the knuckle mounting portion and the first and second vehicle body mounting portions.

10. The suspension arm for a vehicle according to claim 9, wherein the concavo-convex portion has a substantially polygonal shape or a substantially circular shape.

11. The suspension arm for a vehicle according to claim 9, wherein the arm main body comprises the first and second upper wall portions that extend in a substantially horizontal direction in a state in which the arm main body is mounted on the vehicle body, and first and second side wall portions that are formed by downwardly bending a peripheral edge of the first and second upper wall portions, the heights of the first and second side wall portions are made smaller in the vicinity of at least one of the knuckle mounting portion and the first and second vehicle body mounting portions in which the concavo-convex portion is formed than other parts, and the concavo-convex portion is formed on a border between the first and second upper wall portions and the first and second side wall portions.

12. The suspension arm for a vehicle according to claim 9, wherein the arm main body comprises the first and second upper wall portions that extend in a substantially horizontal direction in a state in which the arm main body is mounted on the vehicle body, first and second side wall portions that are formed by downwardly bending a peripheral edge of the first and second upper wall portions, and a lower wall portion that is formed by bending an end part that is not continuous to the first and second upper wall portions in at least one part of the first and second side wall portions, and the concavo-convex portion is formed at a position of a boundary between a part where the lower wall portion is provided and a part where the lower wall portion is not provided within the border between the first and second upper wall portions and the first and second side wall portions.

13. A suspension arm for a vehicle in which an arm main body that is formed by press forming a metal plate comprises a knuckle mounting portion on which a knuckle is mounted and a vehicle body mounting portion that is mounted on a vehicle body, and an outer face of the vehicle body mounting portion is fixed by welding to a weld part formed at an end edge of the arm main body, wherein the weld part of the arm main body comprises a first weld part that extends substantially horizontally in a state in which the arm main body is mounted on the vehicle body, and second and third weld parts that extend downwardly from opposite ends of the first weld part, a distance between lower ends of the second and third weld parts being set larger than a distance between upper ends thereof.

14. A suspension arm for a vehicle comprising an arm main body that is formed by press forming a metal plate, wherein the arm main body comprises a knuckle mounting portion on which a knuckle is mounted and first and second vehicle body mounting portions that are mounted on a vehicle body, and a concavo-convex portion is formed on a peripheral edge part of at least one of the knuckle mounting portion and the first and second vehicle body mounting portions.

* * * * *